United States Patent
Barnes

(10) Patent No.: US 6,981,777 B2
(45) Date of Patent: Jan. 3, 2006

(54) EMERGENCY RUNNING LIGHT SYSTEM FOR WATERCRAFT AND TRAILERS

(76) Inventor: David P. Barnes, 401 SE. 4th St., Deerfield Beach, FL (US) 33441

( * ) Notice: Subject to any disclaimer, the term of this patent is extended or adjusted under 35 U.S.C. 154(b) by 87 days.

(21) Appl. No.: 10/831,186

(22) Filed: Apr. 26, 2004

(65) Prior Publication Data

US 2005/0237730 A1 Oct. 27, 2005

(51) Int. Cl.
*F21K 2/00* (2006.01)

(52) U.S. Cl. .......... 362/34; 362/477; 362/485; 362/542; 362/546; 362/189; 362/191; 362/368

(58) Field of Classification Search .......... 362/34, 362/477, 485, 542, 546, 189, 191, 278, 293, 362/319, 368, 431
See application file for complete search history.

(56) References Cited

U.S. PATENT DOCUMENTS

| | | |
|---|---|---|
| 3,329,621 A | 4/1967 | Rauhut et al. |
| 3,352,791 A | 11/1967 | Sheehan et al. |
| 3,399,137 A | 8/1968 | Rauhut et al. |
| 3,425,949 A | 2/1969 | Rauhut et al. |
| 3,442,815 A | 5/1969 | Rauhut et al. |
| 3,539,794 A | 11/1970 | Rauhut et al. |
| 3,576,987 A | 5/1971 | Voight et al. |
| 3,597,362 A | 8/1971 | Bollyky et al. |
| 4,015,111 A | 3/1977 | Spector |
| RE30,103 E | 9/1979 | Spector |
| 4,193,109 A | 3/1980 | Heffernan et al. |
| 4,405,973 A | 9/1983 | Moscarillo |
| 4,508,642 A * | 4/1985 | World .......... 252/700 |
| 4,635,166 A | 1/1987 | Cameron |
| 5,171,081 A * | 12/1992 | Pita et al. .......... 362/34 |
| 5,315,491 A * | 5/1994 | Spencer et al. .......... 362/84 |
| 5,390,086 A | 2/1995 | Holland |
| 5,416,670 A | 5/1995 | Authier |
| 5,860,724 A * | 1/1999 | Cheng .......... 362/34 |
| 6,267,914 B1 | 7/2001 | Cranor |

\* cited by examiner

*Primary Examiner*—Sandra O'Shea
*Assistant Examiner*—Sharon Payne
(74) *Attorney, Agent, or Firm*—Oltman, Flynn & Kubler

(57) ABSTRACT

An emergency running light for vehicles such as watercraft includes a cup-shaped housing made of a transparent, thin flexible wall which defines a cup-shaped interior chamber. A liquid component of a two-component chemiluminescent compound and a breakable capsule containing a second component thereof are disposed within the interior chamber. The running light is activated to produce a predetermined color of light by squeezing the flexible housing to break the container. This causes the first and second component liquids to form the chemiluminescent compound and resulting light. The housing is attachable to a surface of the watercraft following activation using an adhesive ring which engages a flat rim of the housing.

20 Claims, 4 Drawing Sheets

EMERGENCY RUNNING LIGHT SYSTEM FOR WATERCRAFT AND TRAILERS

BACKGROUND OF THE INVENTION

1. Field of the Invention

The present invention relates generally to the field of chemical light generators such as chemiluminescent light sticks. More specifically the present invention relates to chemical light generators attachable to watercraft, trailers, and other vehicles for use as emergency running lights when the electrically powered running lights fail. The emergency running lights include a cup-shaped housing having a closed end, an open end which terminates at a rim, and an interior recess which extends inwardly thereinto from the open end. The housing is comprised of a thin, flexible wall which defines a watertight, cup-shaped interior chamber containing a first component of a two-component chemiluminescent compound. A breakable container is disposed within the interior chamber which contains a second component of the two-component chemiluminescent compound. A mounting device is provided for attaching the housing to the vehicle. The running light is activated to produce chemiluminescent light by squeezing the breakable container within the housing to break the container and cause the first and second components to mix to form the chemiluminescent compound and the resulting light. The housing is attachable to the surface of the vehicle using the mounting device.

The housing is preferably substantially circular in cross-section with the front end thereof generally flat, and an exterior portion of the housing outwardly convex. The rim is a flat, with an annular mounting surface to which the mounting device in the form of a double sided adhesive coated ring is affixable for attaching the housing to the vehicle. The interior recess is configured to receive a pole-mounted electrically powered running light of the vehicle therein. A second mounting device in the form of a double sided adhesive coated disk is used for attaching the housing to the electrically powered running light.

2. Description of the Prior Art

Chemiluminescent lighting devices which produce chemiluminescent light by mixing together components that chemically react together to provide excitation for a fluorescent compound or flourescer therein have been known for many years. A basic chemiluminescent liquid is made by mixing a first component in the form of a "peroxide component" comprising hydrogen peroxide and a solvent or mixture of solvents, and a second component in the form of an "oxalate component" comprising an oxalic acid ester and a solvent. One of the components additionally contains the fluorescer to produce the light during the reaction of the first and second components. A catalyst may be included in one of the components for controlling light intensity and the period of light production. The oxalate ester-solvent combination of the first component provides sufficient solubility of the ester and provides chemical stability for storage. The hydrogen peroxide-solvent combination of the second component provides sufficient solubility for the hydrogen peroxide and provides chemical stability for storage. Most chemiluminescent devices utilize a single fluorescer and produce a single desired color of light. However, two or more fluorescers have also been used to produce a blended color of light such as by mixing a fluorescer which emits light of a blue color with a fluorescer which light of a red color to produce a light of a blended pink color.

Chemiluminescent lighting devices are commonly used as emergency lights for automobiles aircraft, and homes when the usual source of electrical power to run the electrically powered lights fails. Additionally, chemiluminescent light devices are used for camping, bicycling, and other situations where there is no source of electrical power. This is because chemiluminescent lighting devices have several advantages over conventional electrical lights including convenience, ease of use, storability for relatively long periods of time, compactness, completely sealed so as to be usable underwater, and safety since no observable heat or any spark is produced for use around flammable liquids such as gasoline.

There have been various chemiluminescent lighting devices which have been patented over the years. For example, in U.S. Pat. No. 3,576,987 issued to Heinz et al. on May 4, 1971 is disclosed a chemical lighting device in the form of a light wand or stick, which is the most commonly used type of chemiluminescent lighting device. Such light sticks have been especially used as emergency road lights and road markers by travelers and may be held in the hand or placed where needed such as alongside a disabled motor vehicle. The light stick of Heinz et al. includes a sealed outer tube made of a flexible translucent material and a sealed inner tube made of a rigid breakable material disposed therein. The inner tube is filled with a first component of a two-component chemiluminescent compound. The outer tube is filled with a second component of the two-component chemiluminescent compound. One of the inner and outer tubes also contains a flourescer. The light stick is activatable by flexing the outer tube sufficiently to break the inner tube which results in mixing of the first and second components to begin generation of the chemiluminescent light, which is visible through the translucent outer tube.

While light sticks such as those of Heinz et al. are generally adequate for the purpose for which they are intended, they suffer from several drawbacks. Firstly, they do not stand up on their own such as for use as an emergency light on the roadway, requiring a stand or similar device. Secondly, light sticks do not emit light evenly in all directions and thus must be oriented to be seen from the desired direction.

Chemiluminescent lighting devices and lighting systems such as using light sticks have been used on watercraft, and variations have been developed specifically for use thereon. This is because the U.S. Coast Guard Navigation Rules require watercraft to display navigational or running lights between sunset and sunrise, and therebetween during periods of reduced visibility such as fog, rain or snow. Smaller watercraft such as those used for recreational purposes are typically required to display a red running light on the port (left) side of the bow of the watercraft, a green running light on the starboard (right) side of the bow of the watercraft, and a white running light at the stern (rear) of the watercraft. The red and green running lights is required to be visible respectively from the port and starboard sides of the watercraft, and the white light is required to be visible from three-hundred-sixty degrees about the watercraft. The running lights are typically permanently installed and electrically powered by an electrical system of the watercraft, though some are battery powered. Electrical running lights are vulnerable to failure of the electrical system which leads to the possibility of collision with other watercraft due to non-visibility thereby, particularly on dark moonless nights on crowded waterways.

An example of a chemiluminescent navigation light system specifically designed for watercraft which utilizes conventional light sticks is disclosed in U.S. Pat. No. 5,416,670 issued to Authier on May 16, 1995. The navigation light system includes a bow light which separately emits light of red and green colors and includes a housing mountable to the bow of the watercraft using a mounting bracket thereof. A pair of light sticks which emit chemiluminescent light respectively of red and green color upon activation thereof are removably contained within the housing and visible therethrough to provide illumination for the port and starboard sides of the watercraft. The navigation light system further includes an aft light which emits light of white color and includes a housing mountable to the stern of the watercraft using a mounting bracket thereof. A light stick which emits chemiluminescent light of white color upon activation thereof is removably contained within the housing and visible therethrough to provide three-hundred-sixty degree illumination for the stern of the watercraft.

While the navigation light system of Authier is generally adequate for the purpose for which it is intended, it suffers from several drawbacks. Firstly, light sticks do not emit light evenly in all directions and thus must be oriented to be seen from the desired direction. Secondly, the light system requires housings with mounting brackets to hold the light sticks in the desired orientation which is bulky, obtrusive, and an expensive way to provide illumination.

An example of a chemiluminescent lighting device specifically designed for emergency lighting in watercraft, but for use illuminating a compass inside the watercraft rather than as running lights is disclosed in U.S. Pat. No. 4,405,973 issued to Moscarillo on Sep. 20, 1983. The emergency lighting device includes a container comprised of a hollow dome masked to reflect light, and a transparent flat lid which is affixed thereto. The container is filled with a first component liquid of a two-component chemiluminescent compound. A breakable pod which contains a second component of the two-component chemiluminescent compound is retained in respective indentations of the dome against the lid. The container is affixed to the housing of a nautical compass using an adhesive ring affixed to the lid to emit light upwardly through the lid to illuminate the compass for viewing.

While the lighting device of Moscarillo is generally adequate for the purpose for which it is intended, it suffers from several drawbacks. Firstly, the internal volume of the container is relatively large due to the domed configuration and complete filling thereof with the first component, producing an excessive amount of the chemiluminescent compound in proportion to the surface area of the lid through which the light is emitted. Secondly, the pod is likely somewhat difficult to break in order to activate the lighting device since it can only be accessed for applying finger pressure from one side (i.e. at the lid).

In U.S. Pat. No. 4,635,166 issued to Cameron on Jan. 6, 1987 is disclosed an emergency safety light for use with motor vehicles. The safety light includes a flat base having a reflective inside surface. A resilient, transparent outer container of a flattened shape is connected to the reflective side of the base and defines an outer compartment for containing a first component of a two-component chemiluminescent compound. Prismatic lens elements are molded into the outer container to refract light generated within the outer compartment in a single outward direction. A breakable inner container is disposed within the outer compartment and contains a second component of the two-component chemiluminescent compound. Squeezing the outer container breaks the inner container to allow mixing of the first and second components to form the chemiluminescent compound, thus emitting chemiluminescent light out through the prismatic lens elements of the outer container. Light produced is also reflected off the reflective surface and out through the prismatic lens elements. The safety light has an adhesive backing on the base to attach the safety light to the rear of motor vehicles. The safety light may be manufactured to emit a desired color of the light.

While the emergency safety light of Cameron is generally adequate for the purpose for which it is intended, it suffers from several drawbacks. Firstly, the safety light does not emit light evenly in all directions, but rather mostly in a single direction, and thus must be oriented to be seen from the desired direction. Secondly, the internal volume of the transparent dome is relatively small due to the flattened configuration of the outer container, resulting in a minimal amount of light being emitted thereby and a short light-producing life.

The control and manipulation over time of the color of light emitted by chemiluminescent reactions is well known in the art. As one of many examples (also see patents listed below), in U.S. Pat. No. 6,267,914 issued to Cranor on Jul. 31, 2001 is disclosed a process for producing chemiluminescent light of varying coloration and to devices which utilize the process. The process utilizes multiple fluorescers which have varying degrees of stability in peroxide. Upon start of the chemiluminescent reaction, light of differing colors is generated by the peroxide stable and less peroxide stable fluorescers resulting in a blended color being emitted. The emitted color of light shifts towards that of the peroxide stable flourescer as the peroxide attacks the less peroxide stable fluorescer. Use of this process in a chemiluminescent light devices produces emitted light which changes in color over time.

It is thus an object of the present invention to provide a chemiluminescent lighting device which does not require a stand or similar device for hands-free operation while the lighting device is in use.

It is another object of the present invention to provide a chemiluminescent lighting device which emits light more evenly in all directions and thus may easily be seen from a wider area of desired directions.

It is a still further object of the present invention to provide a chemiluminescent lighting device which is self-contained, requiring no separate housings or mounting brackets to hold the lighting device in the desired orientation.

It is still another object of the present invention to provide such a chemiluminescent lighting device which is not bulky, is unobtrusive, and of an inexpensive disposable design.

It is yet another object of the present invention to provide such a chemiluminescent lighting device in which the internal volume of the lighting device along with the size and configuration thereof requires an amount of chemiluminescent compound more in proportion to the surface area through which the light is emitted to optimize the amount of light emitted thereby and the light-producing life thereof.

It is still another object of the present invention to provide such a chemiluminescent lighting device in which it is easy to break the frangible container to activate the lighting device by applying finger pressure.

It is finally an object of the present invention to provide such a chemiluminescent lighting device which is readily attachable to surfaces including somewhat irregular and curved surfaces.

SUMMARY OF THE INVENTION

The present invention accomplishes the above-stated objectives, as well as others, as may be determined by a fair reading and interpretation of the entire specification.

A disposable emergency running light attachable to watercraft, trailers, and other vehicles, and emergency running light systems comprised of pluralities of the emergency running lights which emit different colors of light and packaged together are provided. The emergency running lights include a cup-shaped housing having a closed end, an open end which terminates at a rim, and an interior recess which extends inwardly thereinto from the open end. The housing is comprised of a thin, flexible wall which defines a watertight, cup-shaped interior chamber. A breakable container is disposed within the interior chamber comprised of a thin wall adapted to be broken by hand and defining an inner chamber. Respective first and second components are provided which when mixed together form a chemiluminescent compound which emits chemiluminescent light. The first component is contained within the interior chamber of the housing and the second component is separately contained within the inner chamber of the container. A mounting device is provided which is adapted for attaching the housing to the vehicle. The running light is activatable to produce chemiluminescent light by squeezing the housing to break the container and cause the first and second components to come into contact to form the luminescent compound and resulting chemiluminescent light. The housing is attachable to the surface of the vehicle using the mounting device. The running light may be made to emit a desired color of light firstly by the housing being clear and the chemiluminescent compound being formulated to emit light of the desired color. Secondly, the chemiluminescent compound may be formulated to emit light of multiple colors including at least one desired color and the housing is adapted to filter and pass therethrough only light of the desired color.

In a preferred running light, the housing is substantially circular in cross-section and the closed front end of the housing generally flat. The interior recess terminates at a flat interior mounting surface. An exterior portion of the housing is slightly outwardly convex. The rim includes a flat, annular mounting surface, and the mounting device comprises a double sided adhesive coated foam core ring adapted for attaching the mounting surface to the vehicle. The interior recess is adapted to receive a pole-mounted running light of the vehicle therein. A second mounting device comprises a double sided adhesive coated foam core disk adapted for attaching the housing to the pole-mounted running light. The wall of the housing comprises a cup-shaped outer shell and a cup-shaped inner shell adapted to fit within the outer shell. The outer shell has an end wall and an annular side wall dependent therefrom. The inner shell has an end wall disposed in the inwardly spaced relationship to the front wall of the outer shell and an annular side wall dependent therefrom disposed in the inwardly spaced relationship to the side wall of the outer shell. The inner and outer shells are joined together at the rim of the housing by an annular flat flange of one thereof having the mounting surface to form the interior chamber therebetween. The container comprises an elongate capsule made of glass or hard plastic.

The emergency running light systems each include a plurality of the emergency running lights packaged together. Each running light is adapted to produce chemiluminescent light of a red, green, yellow, or white color. An emergency running light system for watercraft includes one red (port), one green (starboard), and one white (aft) running light. An emergency running light system for trailers includes two red (rear) and two yellow (side) running lights. An emergency running light system for combined watercraft and trailers includes three red (one port and two rear), one green (starboard), one white (aft), and two yellow (side) running lights.

BRIEF DESCRIPTION OF THE DRAWINGS

Various other objects, advantages, and features of the invention will become apparent to those skilled in the art from the following discussion taken in conjunction with the following drawings, in which:

FIG. 7 is a perspective view of the running light system for watercraft with the plurality of running lights as attached to a jet-ski boat, showing the pair of running lights which respectively emit light of red and green colors attached to a bow of the jet-ski boat, and the running light which emits light of white color attached to a pole mounted electrically powered running light at a stern of the jet-ski boat.

FIG. 8 is a perspective view of the running light system for watercraft with the plurality of running lights as attached to an air boat, showing the pair of running lights which respectively emit light of red and green colors attached to a bow of the air boat, and the running light which emits light of white color attached to a pole mounted electrically powered running light at a stern of the air boat.

FIG. 9 is a perspective view of a combined running light system for watercraft and trailers, with the plurality of running lights of the running light system for watercraft as attached to a ski boat with outboard motor, showing the pair of running lights which respectively emit light of red and green colors attached to a bow of the ski boat, and a running light which emits light of white color attached atop the outboard motor, and with a plurality of running lights of a running light system for trailers as attached to a boat trailer, showing a pair of running lights which emit light of yellow color attached to respective port and starboard sides midway along the ski boat, and a pair of the running lights which emit light of red color attached to a stern of the ski boat.

DETAILED DESCRIPTION OF THE PREFERRED EMBODIMENTS

Figure 1:
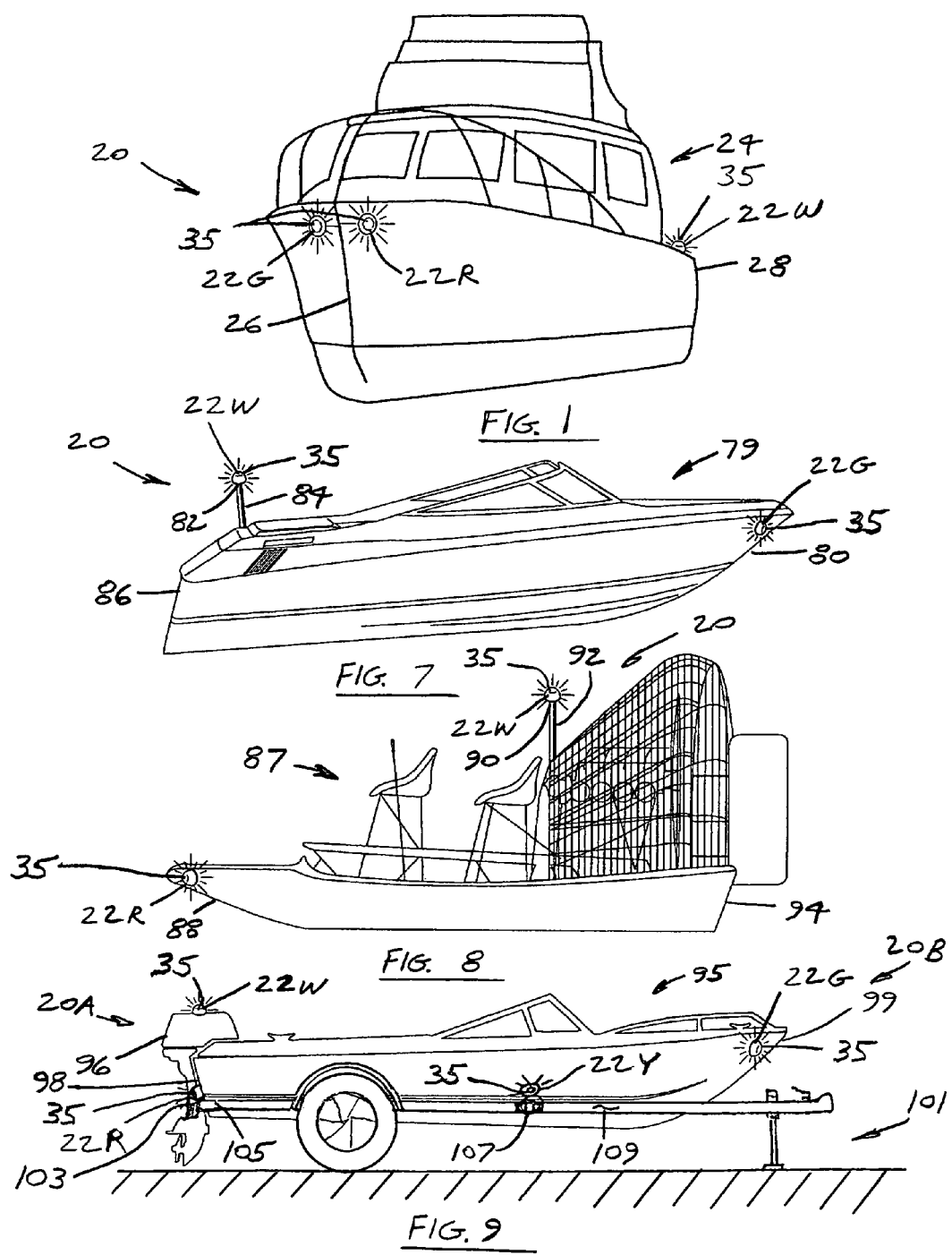
FIG. 1 is a perspective view of a preferred emergency running light system for watercraft in the form of a plurality of running lights as attached to a yacht, showing a pair of running lights which respectively emit red and green light attached to a bow of the yacht, and a running light which emits white light attached to a stern of the yacht.
Figure 2:
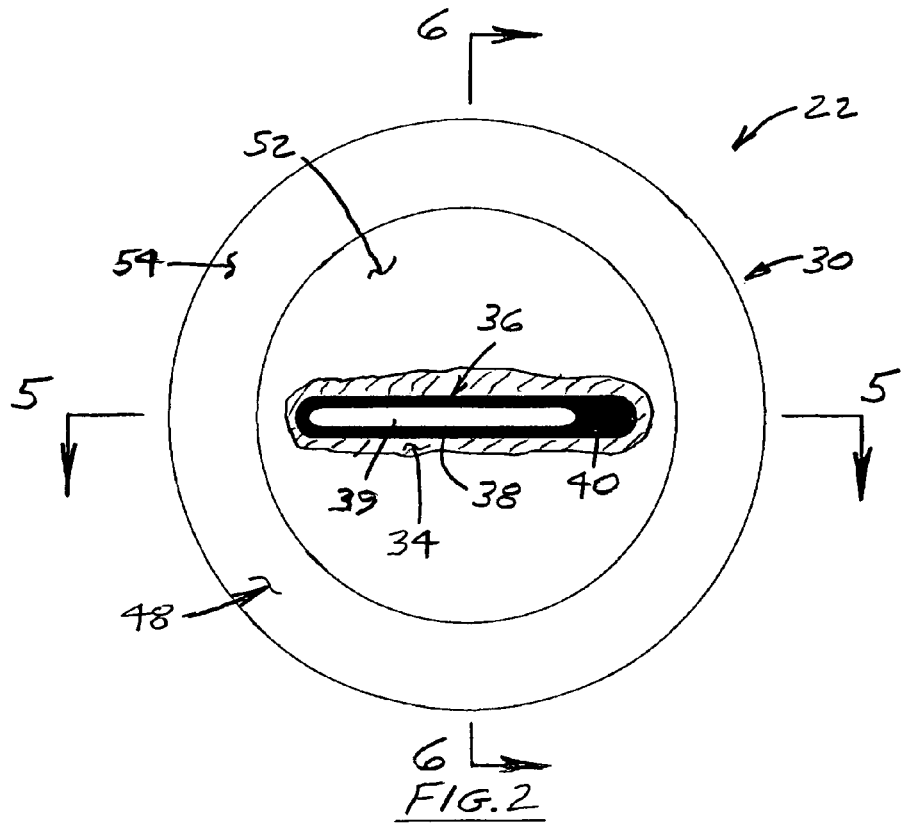
FIG. 2 is a top plan view of one running light showing a common construction thereof regardless of the color of light emitted, the running light system including a flexible, cup-shaped housing with an interior chamber which contains a first component and a breakable capsule containing a second component which components when mixed together form a chemiluminescent compound.
Figure 3:
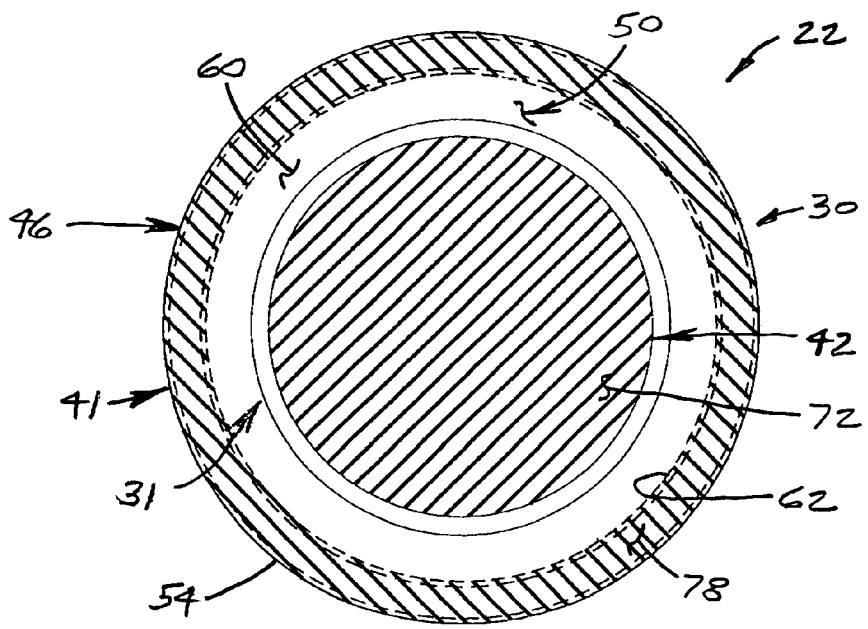
FIG. 3 is a bottom plan view of the running light showing an adhesive disk and an adhesive ring for respectively mounting the running light to a pole mounted electrically powered running light and to a surface of watercraft.
Figure 4:
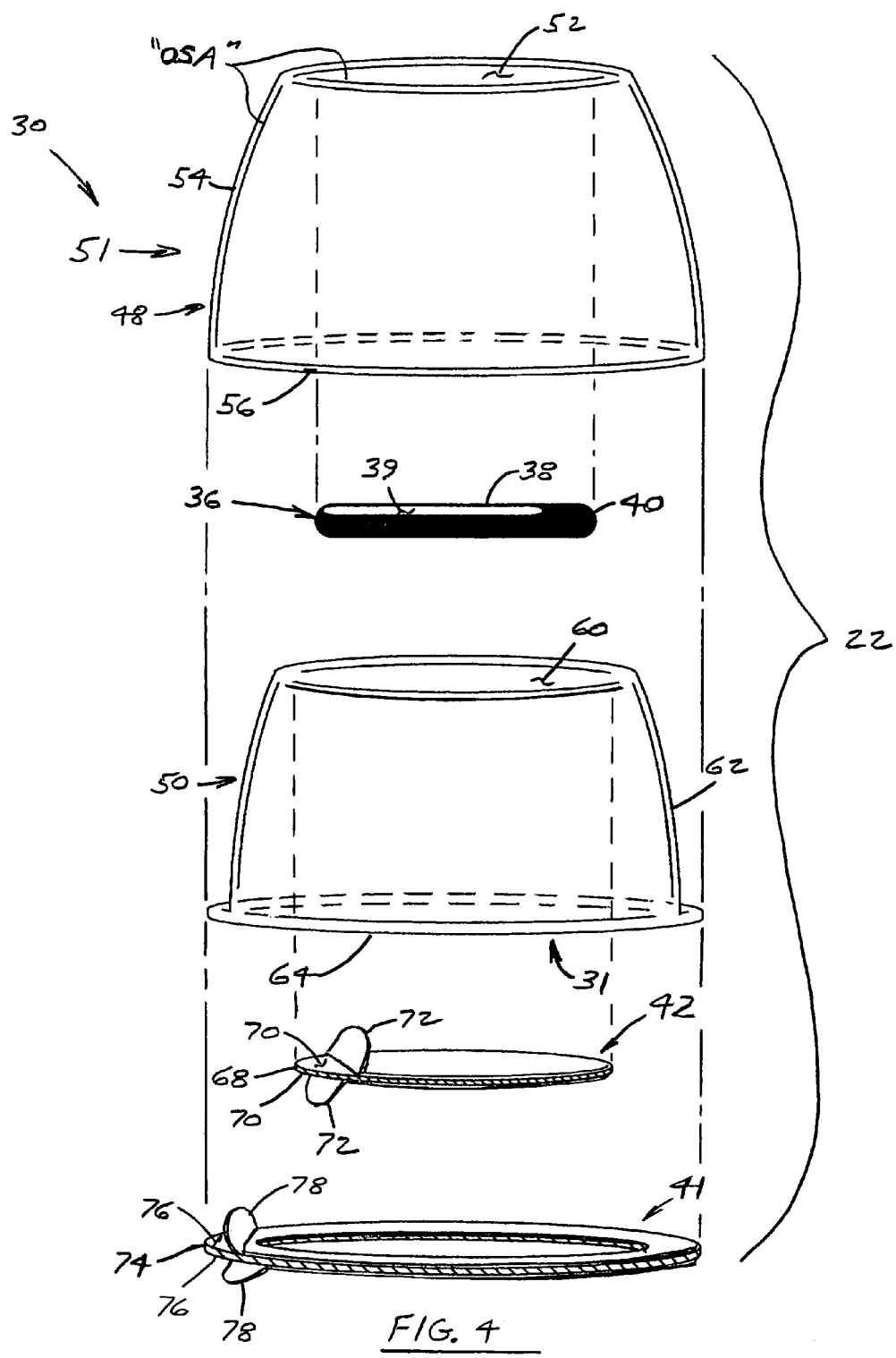
FIG. 4 is an exploded perspective view of the running light showing details of the construction thereof, including respective cup-shaped inner and outer shells made of flexible plastic which comprise the housing, and further showing the first component, the capsule containing the second component, the adhesive disk, and the adhesive ring.
Figure 5:
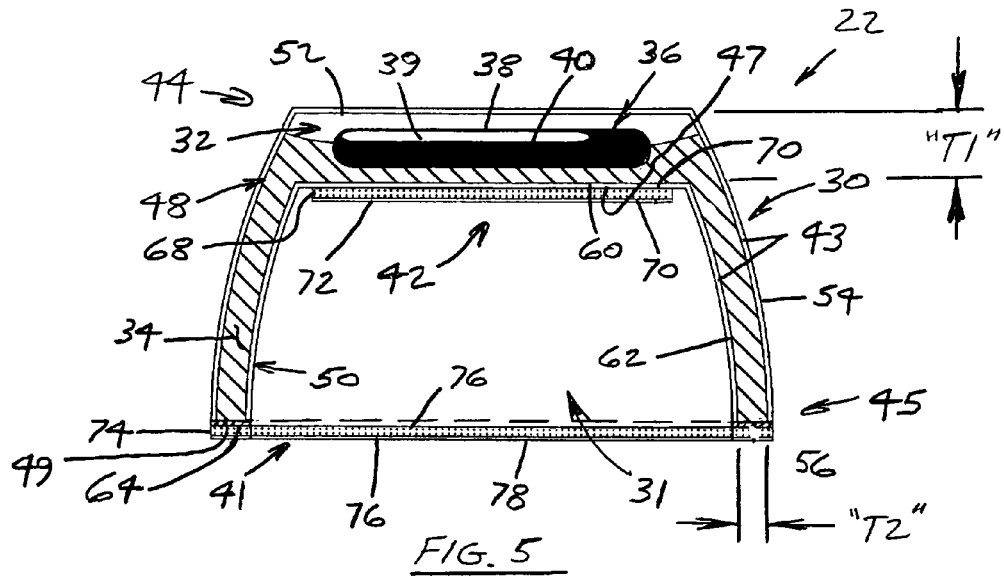
FIG. 5 is a lateral vertical sectional view of the running light taken on the line 5—5 of FIG. 2 more clearly showing the cup-shaped interior chamber containing the first component and the capsule containing and separating the second component therefrom until activated by breaking the capsule.
Figure 6:
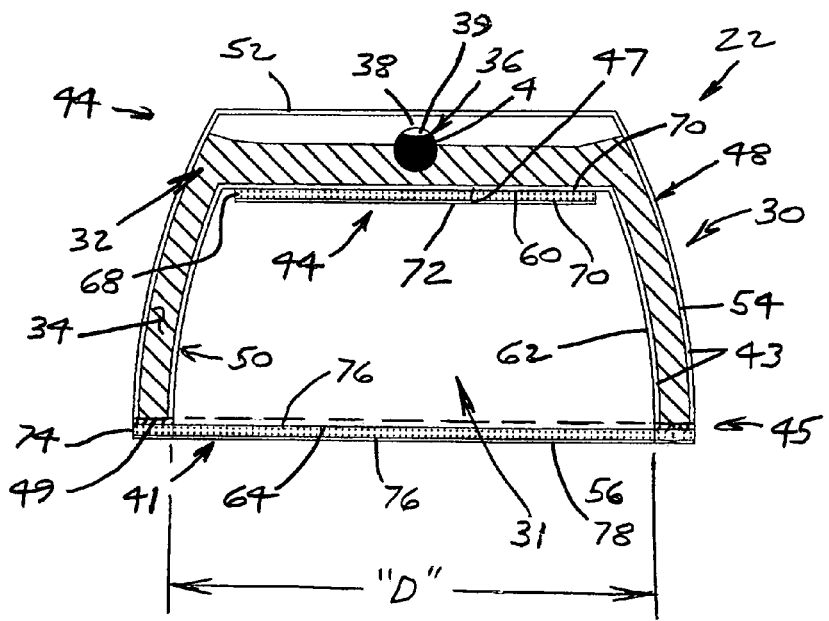
FIG. 6 is a lateral vertical sectional view of the running light taken on the line 6—6 of FIG. 2 at a right angle to the section of FIG. 5, more clearly showing the cup-shaped interior chamber containing the first component, and the capsule containing the second component shown in lateral cross-section.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

PREFERRED EMBODIMENT

Referring to FIGS. 1–6, an emergency running light system 20 for watercraft is disclosed which includes a plurality of emergency running lights 22 which are typically initially packaged together for convenience. The running lights 22 produce chemiluminescent light upon activation thereof and are self-contained, requiring no electrical power to operate. The running lights 22 are adapted to individually produce light of colors, including a red (port or left) running light 22R, a green (starboard or right) running light 22G, and a white (aft or rear) running light 22W specifically for watercraft. A yellow running light 22Y is also provided for use on boat trailers and the like as described subsequently. The running lights 22 are adhesively attachable to flat surfaces as well as somewhat irregular and curved surfaces of all types of watercraft, trailers, and other vehicles, such as yachts, jet-ski boats, air boats, outboard and inboard powered ski boats, fishing boats, sail boats, runabouts, cruisers, wave-runners, and the like. The red, green, and white running lights 22R, 22G, and 22W are required by the U.S. Coast Guard on all watercraft for navigation at night. They may be packaged together as desired and individually removed when needed, being easily stored on the watercraft with other emergency kits such as a flare kit, horn, first-aid kit, tool kit, and the like. The running lights 22 are of a compact, non-bulky and unobtrusive cup-shaped design which provides high three-hundred-sixty degree visibility.

The running lights 22 utilize chemiluminescence to glow for about eight hours upon activation, which is enough time to get the boat or other watercraft back to the dock or to get a trailered boat back home upon failure of the electrically powered running lights. The running lights 22 are of a unique rounded, cup-shape which is preferably completely transparent and filled with a chemiluminescent compound so as to be much more visible from all directions than standard rod-shaped chemiluminescent light sticks. The cup-shape thereof allows easy hand-activation, and ready attachment to flat surfaces as well as somewhat irregular and curved surfaces in seconds when the conventional electrically powered running lights on a watercraft or trailer fail to illuminate.

FIG. 1 shows the emergency running light system 20 for watercraft with the red, green, and white running lights 22R, 22G, and 22W thereof activated and attached as emergency lighting for a yacht 24 when the conventional electrically powered running lights (not shown) are not working, such as in a power failure on yacht 24. The red running light 22R is adhesively affixed to a bow 26 of the yacht 24 on the port side thereof, the green running light 22G is adhesively affixed to to the bow 26 on the starboard side thereof, and a pair of the white running lights 22W are affixed to a stern 28 of yacht 24 at the port and starboard sides thereof. The red, green, and white running lights 22R, 22G, and 22W are placed in conformance with standard nautical practices.

As best shown in FIGS. 2–6, all of the running lights 22R, 22G, 22Y, and 22W are preferably of a common construction to minimize manufacturing costs, generically designated as the running light 22, and which are adapted to emit the light of the colors red, green, yellow, white. or other desired color. The running light 22 includes a flexible, cup-shaped housing 30 preferably made of flexible plastic or similar transparent material which is inert and non-reactive with the chemicals used in running light 22, with an interior recess 31. The housing 30 defines a corresponding cup-shaped interior chamber 32 which contains a first component 34, preferably a liquid such as hydroperoxide, of a two-component chemiluminescent compound 35. A breakable container in the form of an elongate capsule 36 is also disposed within the interior chamber 32 comprised of a thin wall 38 adapted to be broken by hand, being made of glass, plastic which may be scored to facilitate controlled breakage, or other suitably breakable, snapable, and/or crushable material which is inert and non-reactive with the chemicals used in running light 22. The wall 38 defines an inner chamber 39 of capsule 36 in which a second component 40 of the two-component chemiluminescent compound 35, such as a chemiluminescent composition, is separately contained. The second component 40 is preferably a liquid, though dry powders, granulated materials, solids, and the like may be used as is known in the art. A first mounting device in the form of an adhesive ring 41 is adapted for attaching the housing 30 to the vehicle, and a second mounting device in the form of an adhesive disk 42 is adapted for attaching the housing 30 to a conventional pole mounted electrically powered running light (not shown) of watercraft as described below. The first and second components 34 and 40, when mixed together, form the chemiluminescent compound 35.

The housing 30 is comprised of a thin, flexible wall 43 made of the plastic or other suitable transparent material which is inert and non-reactive with the with the chemicals used in running light 22 as stated above. Housing 30 is preferably circular in cross-section, though other cross-sections are possible such as oval, rounded rectangular, and the like while maintaining the general cup-shape. The housing 30 has a closed end 44 which is generally flat and an open end 45 which terminates at a rim 46. The interior recess 31 extends inwardly thereinto from the open end 45 and which terminates at a flat interior mounting surface 47 for engaging the adhesive disk 42. An exterior portion 48 of the housing 30 is preferably slightly outwardly convex. The rim 46 has a flat, annular exterior mounting surface 49 for engaging the adhesive ring 41 to attach the housing 30 to the yacht 24. The housing 30 is sealed in a water tight manner so as to contain the first component 34, yet is made of relatively thin material for activation by breaking the capsule 36 so as to be squeezably deformable while returning to its undeformed shape upon release of squeezing or other force thereon. Housing 30 is sufficiently flexible, including slightly twistably deformable, to conform to somewhat irregular surfaces, slightly curved surfaces, and the like of the yacht 24 or other vehicle. Thus, running light 22 does not require a stand, housing, mounting bracket, or similar device to hold the lighting device in the desired orientation for hands-free operation thereof.

The hollowed cup-shaped housing 30 having the interior recess 31 provides the interior chamber 32 with a relatively uniform thickness, including a thickness "T1" to accommodate capsule 36, and a slightly lesser thickness "T2" elsewhere which retains capsule 36 in the general position shown. A pair of clips (not shown) or other retaining device may be molded into wall 43 or otherwise provided to engage and further restrain capsule 36 in a specific position. The small thickness "T1" permits easy breaking of capsule 36 by applying finger pressure between the thumb and forefinger of a user's hand (not shown) to activate the lighting device, unlike prior art chemiluminescent lighting devices. The hollowed design of housing 30 with thicknesses "T1" and "T2", which are relatively small as compared to a diameter "D" of interior recess 31, allows the running light 22 to emit chemiluminescent light more evenly in all directions and thus may easily be seen from three-hundred-sixty degrees therearound as well as from above. Likewise, the volume of the interior chamber 32 of housing 30 is of a size and configuration (interior recess 31 not being filled with the first component 34) such that the volume of chemiluminescent compound 35 upon activation in proportion to an outer surface area "OSA" of housing 30 (through which the light is emitted) is much lower than prior-art lighting devices which are completely filled and do not have the interior recess 31. This tends to optimize the amount of light emitted and the light-producing life of the running light 22.

The wall 43 of housing 30 may be of a single piece (not shown) such as by blow-molding from a plastic tube material with a sealable filler opening (not shown) provided to allow placement into the interior chamber 32 the first component 34 and the capsule 36 containing the second component 40. Alternatively, for vacuum-forming of housing 30 from plastic sheet material, the wall 43 may comprise a cup-shaped inner shell 50 and a cup-shaped outer shell 51, inner shell 50 being adapted to fit within the outer shell 51. Each of the inner and outer shells 50 and 51 are made of a clear, flexible plastic material such as polyethylene, polypropylene, or polyvinyl chloride which may be vacuum formed from sheet plastic material, injection molded, or the like. The outer shell 51 has a flat end wall 52 and a slightly outwardly convex, annular side wall 54 dependent therefrom which terminates at an annular edge 56. The inner shell 50 has a flat end wall 60 which is disposed in an inwardly spaced relationship to the end wall 52 of the outer shell 51 and an outwardly convex, annular side wall 62 dependent therefrom which is disposed in the inwardly spaced relationship to the side wall 54 of the outer shell 51 and which terminates at an radially outwardly disposed, annular flat flange 64 having the exterior mounting surface 49. The inner shell 50 defines the interior recess 31 adapted to receive a pole-mounted electrically powered running light (see below) of the vehicle therein. The inner and outer shells 50 and 51 are joined together at the rim 46 of the housing 30 to form the interior chamber 32 therebetween, the edge 56 of outer shell 51 being bonded to the flange 64 of inner shell 50 such as by using an adhesive, heat sealing, ultrasonic welding, or other suitable method. This seals the first component 34, the capsule 36, and the second component 40 (when capsule 36 is ruptured) within the interior chamber 32 in a leak-free manner. The design of housing 30 for vacuum molding, blow-molding, or other such process for plastic materials adapted for medium to high volume production provides an inexpensive, disposable running light 22.

The adhesive ring 41 and the adhesive disk 42 are preferably made of the same materials as conventional double sided adhesive coated foam core tape, which allows removal of the running light 22 following emergency using an appropriate adhesive which sticks securely yet is removable. Alternatively, the foam may be broken and the residual foam and adhesive adhering to the vehicle carefully scraped therefrom or removed using an adhesive solvent. The adhesive disk 42 is of circular shape and includes a foam core 68 coated on opposite surfaces with respective adhesive layers 70. The adhesive layers are temporarily covered by respective removable cover papers 72 coated with a release agent to facilitate removal therefrom which protect the adhesive disk 42 until the running light 22 is needed for use. The adhesive disk 42 is affixed to the interior mounting surface 47 within the interior recess 31 using one of the adhesive layers 70 by removing a corresponding one of cover papers 72. Alternatively, the adhesive disk 42 may be a double sided adhesive coated disk (non-foam core), one or more strips of conventional double sided adhesive coated foam or non-foam core tape, other suitable adhesive strips, or an adhesive layer (all not shown).

The adhesive ring 41 includes a foam core 74 coated on opposite surfaces with respective adhesive layers 76. The adhesive layers 76 are temporarily covered by respective removable cover papers 78 coated with a release agent to facilitate removal therefrom which protect the adhesive ring 41 until the running light 22 is needed for use. The adhesive ring 41 is affixed to the exterior mounting surface 49 on flange 64 using one of the adhesive layers 76 by removing a corresponding one of cover papers 78. Alternatively, the adhesive ring 41 may be may be a double sided adhesive coated ring (non-foam core), one or more strips of conventional double sided adhesive coated foam or non-foam core tape, or other suitable adhesive strip cut to length and curved to fit to flange 64 or an adhesive layer (all not shown).

The adhesive ring 41 and the adhesive disk 42 provide quick and easy mounting of the running lights 22 to vehicles by simply removing the appropriate cover paper 72 or 78 and pressing in a desired area on the vehicle. This includes areas not shown in FIGS. 1 and 7–9 such as on other areas of watercraft such as on a T-top, a hard top, or a transverse arch. The flexibility of the housing 30, the adhesive ring 41, and the adhesive disk 42 allow the running light 22 to conform to the shape of the watercraft or trailer to provide a strong yet removable bond.

The red, green, yellow, white, or other desired color of light may be produced by running lights 22 in several ways. Firstly, the housing 30 may be clear (i.e. colorless), and the first and second components 34 and 40 (or additional components) which are mixed together to form the chemiluminescent compound 35 formulated to emit light of the desired red, green, yellow, white, or other color including blends thereof. Secondly, or in combination therewith, the first and second components 34 and 40, (or additional components) which are mixed together to form the chemiluminescent compound 35 may be formulated to emit light of a more general spectrum of multiple blended colors of light including the desired color. In this case, the housing 30 (or just outer shell 51) is tinted, specially designed, made of specially compounded materials, or otherwise adapted to filter the light of the more general spectrum so as to pass therethrough only light of the desired red, green, yellow, white, or other color including blends thereof.

The first way to produce red, green, yellow, white, or other desired color of light is well-known in the art. This is done using various flourescers, dyes, pigments, or various combinations thereof. The color of the light emission primarily depends on the flourescer used and its spectral response. The dyes and pigments "color" the light emitted by the flourescer as desired. The first and second components 34 and 40, and the resulting chemiluminescent compound 35 may be of any suitable type known in the art, such as those disclosed in U.S. Pat. No. 3,539,794 issued to Rauhut et al; U.S. Pat. No. 3,576,987 issued to Heinz et al.; U.S. Pat. No. 3,399,137 issued to Rauhut et al.; U.S. Pat. No. 3,442,815 issued to Rauhut et al., U.S. Pat. No. 3,352,791 issued to Sheehan et al.; U.S. Pat. No. 3,329,621 issued to Rauhut et al.; U.S. Pat. No. 3,425,949 issued to Rauhut et al.; U.S. Pat. No. 3,597,362 issued to Bollyky et al.; and U.S. Pat. No. 6,267,914 issued to Cranor the disclosures of which patents are all herein incorporated by reference. Other chemiluminescent compounds 35 and related materials are described in: "Chemie, Int. Ed.", by K. D. Gunderman Angew Publishers, Inc. (1965); "Fluorescence and Phosphorescence", by Peter Pringsheim, Interscience Publishers, Inc. (1949); "The Color Index", Second Edition, Vol. 2, The American Association of Textile Chemists and Colorists (1956); and "Chem. Revs.", by M. L. Bender, Vol. 60, (1960), the entire disclosures of which are all herein incorporated by reference.

Examples of flourescers which when mixed with hydroperoxide produce light of various colors include: A) 2-Methyl-9,10-Bis-(Phenylethynyl) Anthracene which emits green light; B) lumogen red (a perylene dicarboximide) which emits red light; C) 9,10-Bis-(4-Methoxyphenyl)-2-Chloroanthracene which emits blue light; D) 5,16,11,12-Tetra-phenylnapthacene which emits orange light; E) 5,12-Bis(Phenylethynyl) Napthacene which emits peach light; and F) 5,16,11,12-Tetra-phenylnapthacene which emits white light. The flourescers may be combined to produce blended colors such as mixing the 9,10-Bis(4-Methoxyphenyl)-2-Chloroanthracene which emits blue light with the lumogen red which emits red light to produce purple light.

Referring again to FIG. 1, the emergency running lights 22 of emergency running light system 20 for watercraft are activatable for use as emergency lighting for the yacht 24 to produce chemiluminescent light by firmly squeezing together the end walls 52 and 60 of housing 30 between the thumb and index fingers (not shown) to snap the capsule 36 therebetween. This causes the first and second components 34 and 40 to come into contact to form the luminescent compound 35 which creates the chemiluminescent light. Shaking the running light 22 by hand facilitates uniform mixing of the first and second components 34 and 40. The red and green running lights 22R and 22G are adhesively attached to the bow 26 of the yacht 24 and the white running light 22W is adhesively attached to the stern 28 of the yacht 24 atop a pole by peeling off the respective cover papers 78 to expose adhesive layers 76 and firmly pressing the running lights 22R, 22G, and 22W thereonto. The red, green and white running lights 22R, 22G and 22W are placed in corresponding position to the same colored electrically powered running lights in conformance with standard nautical practices.

FIG. 7 shows the emergency running light system 20 for watercraft with the red, green and white running lights 22R, 22G and 22W thereof activated as describe above and attached as emergency lighting for a jet-ski boat 79 when the conventional electrically powered running lights (most not shown) are not working, such as in a power failure on the jet-ski boat 79. The red running light (not shown) is adhesively affixed to a bow 80 of the jet-ski boat 79 on the port side thereof and the green running light 22G is adhesively affixed to the bow 80 on the starboard side of the jet-ski boat 79, both preferably just below the rub rail (not shown) thereof. The white running light 22W is adhesively affixed to a conventional electrically powered running light 82 atop a pole 84 centrally disposed at a stern 86 of the jet-ski boat 79 by peeling off the cover papers 72 to expose adhesive layers 70 of adhesive disks 42 and pressing the running light 22W thereonto. The running light 82 fits within the interior recess 31 of housing 30 to engage the adhesive layer 70 of adhesive disk 42 to retain running light 22W thereto. The cup-shape of running light 22W and its position atop pole 84 illuminates three-hundred-sixty degrees about the jet-ski boat 79. The red, green, and white running lights 22R, 22G, and 22W are disposed as stated above in conformance with standard nautical practices.

FIG. 8 shows the emergency running light system 20 for watercraft with the red, green, and white running lights 22R, 22G, and 22W thereof activated and attached as emergency lighting for an air boat 87 when the conventional electrically powered running lights (most not shown) are not working, such as in a power failure on the swamp-air boat 87. The red running light 22R is adhesively affixed to a bow 88 of the air boat 87 on the port side thereof and the green running light (not shown) is adhesively affixed to the bow 88 on the starboard side of the air boat 87. The white running light 22W is adhesively affixed to a conventional electrically powered running light 90 atop a pole 92 centrally disposed at a stern 94 of the air boat 87 as described above. The cup-shape of running light 22W and its position atop pole 92 illuminates three-hundred-sixty degrees about the air boat 87. The red, green, and white running lights 22R, 22G, and 22W are disposed as stated above in conformance with standard nautical practices.

FIG. 9 shows the emergency running light system 20 for watercraft with the red, green, and white running lights 22R, 22G, and 22W thereof activated and attached as emergency lighting for a ski boat 95 with an outboard motor 96 bolted to a stern 98 thereof when the conventional electrically powered running lights (not shown) are not working, such as in a power failure on the ski boat 95. The red running light (not shown) is adhesively affixed to a bow 99 of the ski boat 95 on the port side thereof and the green running light 22G is adhesively affixed to the bow 99 on the starboard side of the ski boat 95, both just below the rub rail (not shown). The white running light 22W is adhesively affixed atop the outboard motor 96 in the same manner. The cup-shape of running light 22W and its position atop outboard motor 96 illuminates three-hundred-sixty degrees about the ski boat 95. The red, green, and white running lights 22R, 22G, and 22W are disposed as stated above in conformance with standard nautical practices.

FIG. 9 further shows an emergency running light system 20A for trailers which is the combination of a plurality of the emergency running lights 22, two red running lights 22R and two yellow (side) running lights 22Y specifically for trailer emergency lighting, which are typically initially packaged together for convenience. The red and yellow running lights 22R and 22Y are shown activated and attached as emergency lighting for a conventional boat trailer 101 supporting the ski boat 95 for trailering when the regular electrically powered running lights are not working, such as in a power failure on boat trailer 101 or a towing vehicle (not shown). A pair of the red running lights 22R are adhesively affixed to the stern 98 of ski boat 95 above respective conventional electrically powered running lights in the form of tail lights 103 at a back 105 of the boat trailer 101. A pair of the yellow running lights 22Y are adhesively affixed to the ski boat 95 on the port and starboard sides thereof above respective conventional electrically powered running lights 107 at respective side members 109 of the boat trailer 101. Alternatively, the running lights 22R and 22Y may be attached directly to the trailer 101. The red and yellow running lights 22R and 22Y are placed in corresponding position to the same-colored conventional electrically powered running lights in conformance with automotive laws.

FIG. 9 yet further shows an emergency running light system 20B for trailered watercraft such as ski boat 95 and trailer 101, which is a combination of the running light systems 20 and 20A. Running light system 20B includes three red (watercraft port and two trailer rear) running lights 22R, one green (watercraft starboard) running light 22G, one white (watercraft aft) running light 22W, and two yellow (trailer side) running lights 22Y for combined watercraft and trailer emergency lighting. The running lights 22R, 22G, 22W, and 22Y are used as separately described above for ski boat 95 and trailer 101.

Thus, the emergency watercraft running light system and emergency running lights of the present invention meet all of the above-enumerated objects by providing a chemiluminescent lighting device which: 1) does not require a stand or similar device for hands-free operation while the lighting device is in use; 2) emits light more evenly in all directions and thus may easily be seen from a wider area of desired directions; 3) is self-contained, requiring no separate housings or mounting brackets to hold the lighting device in the desired orientation; 4) is not bulky or obtrusive and is of an inexpensive disposable design; 5) the internal volume of the lighting device is of a size and configuration which requires an amount of chemiluminescent compound in proportion to the surface area through which the light is emitted to optimize the amount of light emitted thereby and the light-producing life thereof; 6) is easy to break the frangible container to activate the lighting device by applying finger pressure; and 7) is readily attachable to surfaces including somewhat irregular and curved surfaces.

Various changes may be made to the emergency running lights and the emergency running light systems of the present invention while staying within the same inventive concept. Examples include, but are not limited to molding textures, lens elements, or the like into the housing, particularly the outer shell, to diffuse, concentrate, or channel the chemiluminescent light in desired patterns. The inner shell may be opaque, such as coated with a reflective aluminum metal layer to outwardly direct the chemilumescent light, or the like as desired. The running lights may be used in other applications such as emergency lighting mounted within the watercraft itself without presenting a fire hazard. As stated above, the housing may be of various outer shapes while retaining the cup-shape thereof retaining the interior recess. Multiple capsules containing different luminescers or other chemicals, even non-liquid powders, solids, and the like, may be utilized as needed to keep the components of three-or-more-component type chemiluminescent compounds in a non-reactive condition until the running light is activated, and to produce the desired color chemiluminescent light for the running lights. The running lights may be individually or group packaged in foil wrappers to extend the shelf life thereof. The first component may be absorbed by a porous, preferably transparent matrix such as a sponge, blotting paper, felt, or the like contained within the interior chamber.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teaching herein are particularly reversed especially as they fall within the breadth and scope of the claims here appended.

What is claimed is:

1. An emergency running light attachable to watercraft, trailers, and other vehicles, comprising:
    a cup-shaped housing having a closed end, an open end which terminates at a rim, and an interior recess which extends inwardly thereinto from said open end, said housing being comprised of a thin, flexible wall which defines a watertight, cup-shaped interior chamber;
    a breakable container disposed within said interior chamber comprised of a thin wall adapted to be broken by hand and defining an inner chamber;
    respective first and second components which when mixed together form a chemiluminescent compound, said first component being contained within said interior chamber of said housing and said second component being separately contained within said inner chamber of said container;
    a mounting device adapted for attaching said housing to the vehicle; and
    wherein the running light is activatable to produce chemiluminescent light by squeezing said housing to break said container to cause said first and second components to come into contact to form said luminescent compound and said chemiluminescent light, said housing being attachable to the surface of the vehicle using said mounting device.

2. The running light of claim 1, wherein the housing is substantially circular in cross-section.

3. The running light of claim 1, wherein the wall of the housing comprises a cup-shaped outer shell and a cup-shaped inner shell adapted to fit within said outer shell, said outer shell having an end wall and an annular side wall dependent therefrom, said inner shell having an end wall disposed in the inwardly spaced relationship to said front wall of said outer shell and an annular side wall dependent therefrom disposed in the inwardly spaced relationship to said side wall of said outer shell, said inner and outer shells being joined together at the rim of said housing to form the interior chamber therebetween.

4. The running light of claim 1, wherein the rim includes a flat, annular mounting surface, and the mounting device is adapted for attaching said mounting surface to the vehicle.

5. The running light of claim 4, wherein the mounting device comprises an adhesive device chosen from the group consisting of a double sided adhesive coated ring, a double sided adhesive coated foam core ring, double sided adhesive coated tape, double sided adhesive coated foam core tape, and an adhesive layer.

6. The running light of claim 4, wherein the housing is sufficiently flexible for the mounting surface to conform to somewhat irregular and slightly curved surfaces of the vehicle.

7. The running light of claim 1, wherein the interior recess is adapted to receive a pole-mounted running light of the vehicle therein, and further comprising a second mounting device adapted for attaching the housing to the pole-mounted running light.

8. The running light of claim 7, wherein the second mounting device comprises an adhesive device adapted to fit within the interior recess chosen from the group consisting of a double sided adhesive coated disk, a double sided adhesive coated foam core disk, double sided adhesive coated tape, double sided adhesive coated foam core tape, and an adhesive layer.

9. The running light of claim 1, wherein the closed front end of the housing is generally flat and the interior recess terminates at a flat interior mounting surface of the housing.

10. The running light of claim 1, wherein an exterior portion of the housing is outwardly convex.

11. The running light of claim 1, wherein the housing is made of plastic.

12. The running light of claim 1, wherein the housing is clear and the chemiluminescent compound is formulated to emit light of a desired color.

13. The running light of claim 1, wherein the chemiluminescent compound is formulated to emit light of multiple colors including at least one desired color, and the housing is adapted to filter and pass therethrough only light of said desired color.

14. The running light of claim 1, wherein the container comprises an elongate capsule made of a material chosen from the group consisting of glass and plastic.

15. An emergency running light attachable to watercraft, trailers, and other vehicles, comprising:
   a cup-shaped housing having a closed end, an open end which terminates at a rim, and an interior recess which extends inwardly thereinto from said open end, said housing being comprised of a thin, flexible wall which defines a watertight, cup-shaped interior chamber;
   a breakable container disposed within said interior chamber comprised of a thin wall adapted to be broken by hand and defining an inner chamber;
   respective first and second components which when mixed together form a chemiluminescent compound, said first component being contained within said interior chamber of said housing and said second component being separately contained within said inner chamber of said container;
   a mounting device adapted for attaching said housing to the vehicle; and
   wherein said rim includes a flat, annular mounting surface, and said mounting device is adapted for attaching said mounting surface to the vehicle, said mounting device comprising an adhesive device chosen from the group consisting of a double sided adhesive coated ring, a double sided adhesive coated foam core ring, double sided adhesive coated tape, double sided adhesive coated foam core tape, and an adhesive layer, said housing being sufficiently flexible for said mounting surface to conform to somewhat irregular and slightly curved surfaces of the vehicle, and said housing is made of plastic, the running light being activatable to produce chemiluminescent light by squeezing said housing to break said container to cause said first and second components to come into contact to form said luminescent compound and said chemiluminescent light, said housing being attachable to the surface of the vehicle using said mounting device.

16. The running light of claim 15, wherein the interior recess is adapted to receive a pole-mounted running light of the vehicle therein, and further comprising a second mounting device adapted for attaching the housing to the pole-mounted running light.

17. The running light of claim 16, wherein the second mounting device comprises an adhesive device adapted to fit within the interior recess chosen from the group consisting of a double sided adhesive coated disk, a double sided adhesive coated foam core disk, double sided adhesive coated tape, double sided adhesive coated foam core tape, and an adhesive layer.

18. The running light of claim 16, wherein the housing is substantially circular in cross-section, the closed front end of said housing is generally flat, the interior recess terminates at a flat interior mounting surface of said housing, an exterior portion of said housing is outwardly convex, and the container comprises an elongate capsule made of a material chosen from the group consisting of glass and hard plastic.

19. The running light of claim 18, wherein the wall of the housing comprises a cup-shaped outer shell and a cup-shaped inner shell adapted to fit within said outer shell, said outer shell having an end wall and an annular side wall dependent therefrom, said inner shell having an end wall disposed in the inwardly spaced relationship to said front wall of said outer shell and an annular side wall dependent therefrom disposed in the inwardly spaced relationship to said side wall of said outer shell, said inner and outer shells being joined together at the rim of said housing by an annular flat flange of one thereof having the mounting surface to form the interior chamber therebetween.

20. An emergency running light system for watercraft and trailers, and other vehicles, comprising:
   a plurality of emergency running lights packaged together, each of which includes a cup-shaped housing having a closed end, an open end which terminates at a rim, and an interior recess which extends inwardly thereinto from said open end, said housing being comprised of a thin, flexible wall which defines a watertight, cup-shaped interior chamber, a breakable container disposed within said interior chamber comprised of a thin wall adapted to be broken by hand and defining an inner chamber, respective first and second components which when mixed together form a chemiluminescent compound, said first component being contained within said interior chamber of said housing and said second component being separately contained within said inner chamber of said container, a mounting device adapted for attaching said housing to the vehicle, wherein said rim includes a flat, annular mounting surface, and said mounting device is adapted for attaching said mounting surface to the vehicle, said mounting device comprising an adhesive device chosen from the group consisting of a double sided adhesive coated ring, a double sided adhesive coated foam core ring, double sided adhesive coated tape, double sided adhesive coated foam core tape, and an adhesive layer, said housing is sufficiently flexible for said mounting surface to conform to somewhat irregular and slightly curved surfaces of the vehicle, said housing is made of plastic, said interior recess is adapted to receive a pole-mounted running light of the vehicle therein, a second mounting device is adapted for attaching said housing to the pole-mounted running light, said second mounting device comprising an adhesive device adapted to fit within said interior recess chosen from the group consisting of a double sided adhesive coated disk, a double sided adhesive coated foam core disk, double sided adhesive coated tape, double sided adhesive coated foam core tape, and an adhesive layer, said running light being activatable to produce chemiluminescent light by squeezing said housing to break said container to cause said first and second components to come into contact to form said luminescent compound and said chemiluminescent light, said housing being attachable to the surface of the vehicle and said pole-mounted running light using respective of said mounting devices; and wherein each of said running lights is adapted to produce chemiluminescent light of a color chosen from the group consisting of red, green, yellow, and white, and wherein said plurality of lights are of a combination and for a purpose chosen from the group consisting of one red (port), one green (starboard), and one white (aft) for watercraft emergency lighting, two red (rear) and two yellow (side) for trailer emergency lighting, and three red (one port and two rear), one green (starboard), one white (aft), and two yellow (side) for combined watercraft and trailer emergency lighting.

* * * * *